United States Patent Office 3,496,223
Patented Feb. 17, 1970

3,496,223
PROCESS FOR PREPARING PHOSPHONIC ACIDS
Riyad R. Irani and Robert S. Mitchell, St. Louis, Mo., assignors to Monsanto Company, St. Louis, Mo., a corporation of Delaware
No Drawing. Filed Dec. 19, 1966, Ser. No. 602,548
Int. Cl. C07f 9/38
U.S. Cl. 260—502.4     1 Claim

ABSTRACT OF THE DISCLOSURE

Processes for preparing 1-hydroxy lower alkylidene-1,1-diphosphonic acids which comprises the steps of reacting an organo ketene such as ketene per se with phosphorous acid at a temperature below about 50° C. and in a reaction medium containing an inert liquid solvent such as acetone to form a normally solid anhydrous reaction product and thereafter recovering the diphosphonic acid from said anhydrous product.

---

The present invention relates to processes for preparing phosphonic acids and, more particularly, to a process for preparing 1-hydroxy, lower alkylidene-1,1-diphosphonic acids, especially 1-hydroxy, ethylidene-1,1-diphosphonic acid.

In general, there are two methods for preparing 1-hydroxy, ethylidene-1,1-disphosphonic acid with one method utilizing as reactants orthophosphorous acid and acetyl chloride or acetic anhydride. The other method entails utilizing as reactants phosphorus trichloride and acetic acid. Each of the foregoing methods have numerous limitations among which include the use of relatively high reaction temperatures and the formation of many and various by-products which must be separated in some manner in order to recover the desired 1-hydroxy, ethylidene-1,1-diphosphonic acid in acceptable purity and yields. As can be appreciated, therefore, a process for preparing 1-hydroxy, lower alkylidene-1,1-disphosphonic acids which, among other things, minimizes or obviates the limitations of the foregoing methods would represent an advancement in this art.

It is therefore an object of this invention to provide a process for preparing a 1-hydroxy, lower alkylidene-1,1-diphosphonic acid, especially 1-hydroxy, ethylidene-1,1-diphosphonic acid, which among other things, can be carried out at relatively low reaction temperatures and without substantial amounts of many and various by-products being formed.

The foregoing and other objects will become apparent from a reading of the following detailed description.

It has now been found that a 1-hydroxy, lower alkylidene-1,1-diphosphonic acid can be prepared advantageously by reacting an organo-ketene and phosphorous acid at a temperature below which a significant degree of polymerization of said ketene occurs and in a reaction medium containing an organic, nonhydroxylated liquid solvent whereby a normally solid anhydrous reaction product is formed, and thereafter recovering the 1-hydroxy, lower alkylidene-1,1-diphosphonic acid from the anhydrous reaction product.

Phosphorous acid can be utilized in the process of the present invention either as orthophosphorous acid ($H_3PO_3$) or condensed phosphorous acid, i.e., pyrophosphorous acid ($H_4P_2O_5$), or mixtures of these.

Organo-ketenes which can be utilized in the process of the present invention includes ketene, $H_2C=C=O$, and/or a monoalkylketene, $RHC=C=O$ (aldoketene) and/or dialkylketene, $R_2C=C=O$ (ketoketene). Such ketenes can, in general, be characterized as having the following formula:

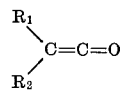

wherein $R_1$ and $R_2$ are each selected from the group consisting of hydrogen and lower alkyl groups (1–4 carbon atoms). Typical organo-ketenes include ketene, dimethylketene, methylethylketene, diethylketene, butylethylketene, ethylketene, butylketene, dibutylketene and the like.

The following is the overall reaction, using orthophosphorous acid as a reactant, in equation form:

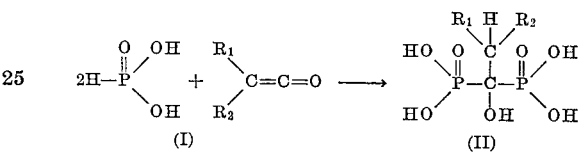

wherein $R_1$ and $R_2$ are each selected from the group consisting of hydrogen and lower alkyl groups (1–4 carbon atoms).

The compounds that can be prepared by the processes of the present invention, i.e., compounds II above, are herein generically termed "1-hydroxy, lower alkylidene-1,1-diphosphonic acid." The compounds can also be termed alkane, 1-hydroxy-1,1-diphosphonic acids. Such compounds have been found to be useful as sequestering agents for heavy metal cations in aqueous systems.

The reaction to prepare the normally solid anhydrous product is temperature dependent to the extent that temperatures should be used which are below the polymerization temperature of the particular organo-ketene, that is, the temperature above which the ketene reactant undergoes a significant degree of polymerization rather than entering into the reaction with the phosphorous acid reactant, and in any event when using temperatures above about 200° C. (under atmospheric pressure, although sub-atmospheric pressures as well as pressures in excess of atmospheric can be used) the yield is extremely low and essentially only degraded or condensed products are formed which do not yield the desired 1-hydroxy, lower alkylidene-1,1-diphosphonic acid. It is preferred that temperatures below about 50° C. be used and it is further preferred that temperatures above about 20° C. be used although temperatures below about 20° C. may be used if longer reaction times can be tolerated.

The reactants can be used in varying amounts depending on such factors as particular reactants, temperature conditions and the like. Generally speaking, it is usually necessary to use at least about 1 mol or organo-ketene reactant per 2 mols of phosphorous acid reactant. It is preferred to use excess amounts of the ketene reactant, that is, amounts above about 1 mol of the ketene reactant per 2 mols of phosphorous acid, and excess amounts of the starting ketene reactant of from about 10% to about 500% are preferred, although amounts in excess of 500% can be used but such amounts do not, in most cases, appear advantageous.

As previously mentioned, the reaction medium is important in order to obtain the advantages of the present invention. In general, a non-hydroxylated, organic liquid solvent (particularly an oxygenated or nitrile solvent) in which phosphorous acid is soluble (in amounts which are being used in the reaction in order that the phosphorous acid reactant can be kept in solution during the reaction) and which is inert toward the organo-ketene reactant (will not to any appreciable degree react with the ketene reactant under the reaction conditions used) has been found to be very effective in order to prepare the desired products advantageously. Water present in the reaction medium appears to have a deleterious effect believed due to hydrolyzing the organo-ketene reactant and thus should not be present to any appreciable extent in the reaction medium. Usually, amounts of such solvent on a weight ratio basis to the orthophosphorous acid of from about 1:50 to 50:1 are adequate with amounts on a weight ratio basis of from about 1:1 to 5:1 being preferred. Amounts of the solvent greatly in excess of those necessary to solubilize the phosphorous reactant can be used although such does not appear advantageous.

In particular, such oxygenated solubilizing agents include ketones, esters and ethers.

Typical examples of such ketones include: acetone, 3-buten-2-one, 2-butanone, butane-2,3-dione, 3-pentanone, 1-pentan-3-one, 3,3-dimethyl-2-butanone, 1-methoxy-2-propanone, 1-chloro-2-propanone, 2-methyl-1-pentan-3-one, 1,1-dichloro-2-propanone, neopentylmethyl ketone, 3-hexanone, 5-hexen-2-one, 1-methoxy-2-butanone, 2,2,4-trimethyl-3-pentanone, 1-bromo-2-propanone, 4-hexen-3-one, 1-propoxy-2-propanone, 4-heptanone, 1-hydroxy-2-propanone, 1-hepten-4-one, 3-heptanone, 2,3-hexandione, 2-ethyl-1-hexen-3-one, 2-methyl-4-octanone, 4-octanone, acetoxy acetone, 3-nonanone, 4-decanone, 6-undecanone, 3-dodecanone, 3-octyne-2-one, 3-chloroacetophenone, 2-dodecanone, 2-tridecanone, 8-pentadecanone and the like.

Typical examples of such ethers include the following: tert-butyl ethylether, chloromethyl ethylether, ethyl isobutyl ether, dioxane sec-butyl ethylether, isopropyl-n-propyl ether, ethylene glycol dimethyl ether, dihydropyran, tert-amyl methyl ether, di-n-propylether, α-chloroethyl ether, n-amyl methyl ether, 1,4-dioxane, ethylene glycol ethyl methyl ether, cyclopentyl methyl ether, β-chloroethyl ether, n-butyl isopropyl ether, n-amyl ethyl ether, di-sec-butyl ether, cyclopentyl ethyl ether, di-isobutyl ether, ethylene glycol methyl n-propyl ether, 2-methoxy-1-propanol, cyclohexyl methyl ether, ethylene glycol monoethyl ether, n-hexyl ethyl ether, diethylene glycol dimethyl ether, ethylene glycol mono-n-butyl ether, phenyl isopropyl ether and the like.

Typical examples of such esters include the following: ethyl acetate, isopropyl acetate, propyl acetate, isobutyl acetate, butyl acetate, methyl amyl acetate, amyl acetate, ethylene glycol mono-methyl ether acetate, ethylene glycol mono-ethyl ether acetate, ethylene glycol monobutyl ether acetate, octyl acetate, diethylene glycol monoethyl ether acetate, diethylene glycol mono-butyl ether acetate, ethylene glycol diacetate, isopropenyl acetate and the like.

As previously mentioned a nitrile solubilizing agent can also be employed. The term nitrile as used herein includes organic compounds containing at least one cyano group or radical per molecule. This radical may be represented by the formula —C≡N. Thus, nitriles which may be employed as solvents include the mono-nitriles having the general formula R—C≡N where R is a monovalent alkyl, alkenyl or cycloalkyl radical. Typical examples of such nitriles include: acetonitrile, propionitrile, butyronitrile, valeronitrile, and the like up to and including stearonitrile and thus containing from about 2 to about 18 carbon atoms per molecule. Additionally, the isomeric (branched chain) alkyl nitriles are also to be included such as isobutyronitrile, methylbutyronitrile, α,α-dimethyl propionitrile, isocapronitrile and the like. The alkenyl nitriles (unsaturated aliphatic nitriles) corresponding to the alkylnitriles can also be employed including acrylonitrile, crotononitrile, vinyl acetonitrile, alkyl acetonitrile and the like. Examples of the cycloalkyl and substituted cycloalkyl nitriles include cyclopentylcyanide, cyclohexylcyanide, cyclopentyl acetonitrile, cyclohexylacetonitrile, methyl cyclopentylcyanide, methyl cyclohexylcyanide and the like. Further, dinitriles can also be employed and such can be represented by the general formula R(C≡N)$_2$ where R is a divalent organic radical, such as alkylene, a cycloalkylene, or a phenylene radical. Examples of such nitriles include malononitrile, succinonitrile, glutaronitrile, adiponitrile, dicyanocyclohexane, dicyanobenzene and the like. Especially preferred are the lower alkyl (1–4 carbon atoms) nitriles such as acetonitrile, propionitrile and the like.

A normally solid (e.g., solid mass at room temperature of about 25° C.) anhydrous reaction product is formed by the foregoing reaction which usually contains, in addition to some of the desired product (1-hydroxy, lower alkylidene-1,1-diphosphonic acids) or derivatives thereof, a complex mixture of products believed to be condensed or dehydrated species, such as polymers, of the desired product.

The normally solid anhydrous reaction product can be recovered from the reaction medium or can be further processed into the desired 1-hydroxy, lower alkylidene-1,1-diphosphonic acid while in the medium. It is preferred, however, to recover the product from the reaction medium prior to processing into the desired phosphonic acid product. Such can be recovered from the reaction medium by many and various means which include centrifuging, decantation and the like since the normally solid reaction product is usually insoluble in the reaction medium or by using a reaction medium having a boiling point slightly higher in temperature than the temperature used for the reaction and thus distilling off the reaction medium from the reaction product.

The desired 1-hydroxy, lower alkylidene-1,1-diphosphonic acids can be recovered from the normally solid anhydrous reaction product by many and various known methods which include an alcohol treatment as disclosed and described in Canadian Patent 728,189, dated Feb. 15, 1966, and a water and/or steam treatment as disclosed and described in Canadian Patent 701,850 dated Jan. 12, 1965, which are incorporated herein by reference. It is preferred, however, to recover the desired 1-hydroxy, lower alkylidene-1,1-diphosphonic acids from the normally solid anhydrous reaction product by steaming. The anhydrous reaction product can be treated with steam while being maintained at elevated temperatures, i.e., above about 100° C., and preferably from about 115° C. to about 150° C., and under atmospheric pressure (although subatmospheric pressures as well as pressures in excess of atmospheric can be used) thereby volatilizing off carboxylic acids, if present, which can be collected for reuse as well as hydrating any of the condensed or dehydrated species of the desired product which may be present. This steaming step yields an aqueous, usually highly concentrated (preferably greater than about 50% by weight), solution or slurry of the desired product. The steam treatment can be carried out by steaming, that is, by passing or introducing steam (at a temperature at from about 100° C. to about 200° C., preferably in the range of from about 110° C. to about 150° C.) into the anhydrous product in such a manner as to establish intimate contact of the anhydrous product with the steam such as by steam sparging and the like.

Depending upon, inter alia, the reactants used and reaction conditions, in some cases (preferably the batch method, infra), it may be necessary to add water to the normally solid anhydrous reaction product prior to recovering the desired product from the normally solid anhydrous reaction product. The amount of water which can be added can vary but is usually in an amount which will cause the exothermic reaction of the anhydrous product (due to the addition of the water) to substantially subside or cease. Such an amount is usually from about 1% to about 40% by weight of the anhydrous product and preferably from about 10% to about 20%.

The 1-hydroxy, lower alkylidene-1,1-diphosphonic acids, normally solid materials, may be recovered from the aqueous medium, if desired, as crystals, by various methods such as, removing the water by evaporation including vacuum evaporation, allowing the compounds to crystallize by cooling a relatively hot saturated aqueous solution, allowing the compounds to crystallize from a saturated solution by seeding the solution, precipitating by the addition of a miscible solvent in which the compounds are less soluble, such as methanol, ethanol, acetone and the like. Usually the amorphous forms of the compounds can be formed when the water of solution is quickly removed under high temperature conditions such as by flash drying, drum drying and the like.

Additionally, if desired, the 1-hydroxy, lower alkylidene-1,1-diphosphonic acid may be recovered from the aqueous medium as a salt by neutralizing the medium with an alkaline material such as the alkali metal hydroxides, carbonates and the like (NaOH, KOH, $Na_2CO_3$ and $K_2CO_3$), the alkaline earth metal hydroxides, carbonates and the like [$Ca(OH)_2$, $Mg(OH)_2$, $CaCO_3$ and $MgCO_3$], ammonium hydroxide, carbonate and the like [$NH_4OH$ and $(NH_4)_2CO_3$], and water soluble amines such as low molecular weight amines (having a molecular weight below about 300) and more particularly the alkyl amines, alkylene amines and alkanol amines containing not more than 2 amine groups, such as, ethyl amine, diethyl amine, propyl amine, propylene diamine, hexyl amine, 2-ethyl hexyl amine, N-butyl ethanol amine, triethanol amine and the like, and precipitating corresponding salt therefrom.

The reaction can be carried out by many and various methods. For example, in a batch process, the phosphorous acid reactant and solvent can be charged to a suitable reaction vessel equipped with a stirrer and the organo-ketene reactant added either continuously or intermittently to the acid under agitation and preferably below the surface thereof to avoid loss of the ketene reactant while the reactants are heated to prepare the normally solid reaction product and thereafter the product can be steam treated in order to recover the desired 1-hydroxy, organo-1,1-diphosphonic acid.

Another method which can be used is a continuous method whereby the reactants are continuously fed into suitable reaction vessels with the rate of feed of the reactants as well as other reaction conditions, such as temperature, used to insure the continuous withdrawal of the desired product. This can be accomplished by, for example, a series of two reaction vessels in which the normally solid reaction product is prepared in a first vessel, then passed to a second vessel in which the steaming step can be performed. The sojourn times in each vessel can be coordinated such that each are about equal, that is, for example, a sojourn time in each vessel of from about 30 to 90 minutes, thus resulting in a relatively continuous passing of reactants into the reaction and exiting of the desired product.

The following examples are presented to illustrate the invention, with parts by weight being used in the examples unless otherwise indicated.

EXAMPLE I

About 10 parts of orthophosphorous acid and 10 parts of acetone are added to a suitable flask connected to a ketene generator (pyrolysis of acetone at 650–675° C.). Into the clear, colorless solution containing the orthophosphorous acid is passed ketene from the ketene generator at a rate of about 2.3 parts per hour for about 3 hours thus forming a normally solid anhydrous reaction product. The temperature of the reaction mixture is held at about 25° C. with cooling. The acetone is separated from the reaction product by decantation and steam sparging is then started and continued while the batch is heated to about 135° C.–140° C. for about 60 minutes. The desired product, 1-hydroxy, ethylidene-1,1-diphosphonic acid, yields about 50% based on phosphorous.

EXAMPLE II

About 10 parts of orthophosphorous acid and 10 parts of acetonitrile are added to a suitable flask connected to a ketene generator (pyrolysis of acetone at 650–675° C.). Into the solution containing the orthophosphorous acid is passed ketene from the ketene generator at a rate of about 2.3 parts per hour for about 3 hours thus forming a normally solid anhydrous reaction product. The temperature of the reaction mixture is held at about 25° C. with cooling. The acetonitrile is separated from the reaction product by decantation and the desired product, 1-hydroxy, ethylidene-1,1-diphosphonic acid, is recovered from the normally solid anhydrous reaction product by steam sparging while the batch is heated to about 135° C.–140° C. for about 60 minutes.

EXAMPLE III

About 5 parts of pyrophosphorous acid and 25 parts of valeronitrile are added to a suitable flask connected to a ketene generator (pyrolysis of acetone at 650–675° C.). Into the solution containing the orthophosphorous acid is passed ketene from the ketene generator at a rate of about 1.1 parts per hour for about 5 hours thus forming a normally solid anhydrous reaction product. The temperature of the reaction mixture is held at about 25° C. with cooling. The valeronitrile is separated from the reaction product by decantation and the desired product, 1-hydroxy, ethylidene-1,1-diphosphonic acid, is recovered from the normally solid anhydrous reaction product by steam sparging while the batch is heated to about 135° C.–140° C. for about 60 minutes.

EXAMPLE IV

About 10 parts of orthophosphorous acid and 25 parts of ethylether are added to a suitable flask. Into the solution containing the orthophosphorous acid is added about 10 parts of diketene with the temperature of the reaction mixture being held at about 30° C. with cooling for about 3 hours. The acetone is separated from the normally solid anhydrous reaction product by decantation and steam sparging is started and continued while the batch is heated to about 135° C.–140° C. for about 60 minutes. The reaction product is cooled to about 100° C. and about 25 parts of methanol are carefully added onto the surface of the product under agitation with the temperature being allowed to drop to about 60° C. After thorough mixing, the volatile components are distilled off. The desired product, 1-hydroxy, ethylidene-1,1-diphosphonic acid, is recovered by adding a little water to the distillation residue and allowing such to crystallize.

EXAMPLE V

About 10 parts of orthophosphorous acid and 25 parts of amylacetate are added to a suitable flask. Into the solution containing the orthophosphorous acid is added about 10 parts of dimethyl ketene over a period of about 15 minutes. The temperature of the reaction mixture is held at about 35° C. with cooling for a period of about 4 hours. The amylacetate is separated from the normally solid anhydrous reaction product by decantation and the desired product, 1-hydroxy, isopropylidene-1,1-diphosphonic acid, is recovered from the solid reaction product by steam sparging while the batch is heated to about 135° C.–140° C. for about 60 minutes.

What is claimed is:

1. A process for preparing a 1-hydroxy, ethylidene-1,1-diphosphonic acid which comprises reacting phosphorous acid and a ketene which has the formula $H_2C=C=O$ to form a normally anhydrous reaction product, said reaction being carried out at a temperature of from about 20° C. to about 50° C. and in a reaction medium containing an organic, oxygenated, non-hydroxylated liquid solvent which is acetone and in which said phosphorous acid is soluble, separating said solvent and said anhydrous product and thereafter recovering said 1-hydroxy ethylidene-1,1-diphosphonic acid from said anhydrous product by steaming.

References Cited

UNITED STATES PATENTS

| 3,122,417 | 2/1964 | Blaser et al. | 260—502.4 |
| 3,366,675 | 1/1968 | Dyer | 260—502.4 |

FOREIGN PATENTS

| 728,189 | 2/1966 | Canada. |
| 978,297 | 12/1964 | Great Britain. |

LEON ZITVER, Primary Examiner

JOSEPH E. EVANS, Assitant Examiner

U.S. Cl. X.R.

260—501.19, 501.2, 501.21